(12) United States Patent
Farmer (10) Patent No.: US 10,403,930 B2
(45) Date of Patent: Sep. 3, 2019

(54) ELECTROCHEMICAL NANOFLUID OR PARTICLE SUSPENSION ENERGY CONVERSION AND STORAGE DEVICE

(71) Applicant: LAWRENCE LIVERMORE NATIONAL SECURITY, LLC, Livermore, CA (US)

(72) Inventor: Joseph C. Farmer, Tracy, CA (US)

(73) Assignee: Lawrence Livermore National Security, LLC, Livermore, CA (US)

(*) Notice: Subject to any disclaimer, the term of this patent is extended or adjusted under 35 U.S.C. 154(b) by 838 days.

(21) Appl. No.: 14/737,754

(22) Filed: Jun. 12, 2015

(65) Prior Publication Data
US 2015/0280281 A1    Oct. 1, 2015

Related U.S. Application Data (62) Division of application No. 12/777,943, filed on May 11, 2010, now abandoned.
(Continued)

(51) Int. Cl.
*H01M 10/05* (2010.01)
*H01M 10/61* (2014.01)
(Continued)

(52) U.S. Cl.
CPC ......... *H01M 10/0561* (2013.01); *B60L 50/64* (2019.02); *B60L 58/26* (2019.02);
(Continued)

(58) Field of Classification Search
None
See application file for complete search history.

(56) References Cited

U.S. PATENT DOCUMENTS 3,551,207 A * 12/1970 Herbst .................... H01M 8/08
429/415
4,800,143 A *  1/1989 Harbach ................. H01M 6/46
429/104
(Continued)

FOREIGN PATENT DOCUMENTS

DE    10213217858 A1 *  3/2015  .......... H01M 8/0494
GB    2030349 A  *  2/1980  ............ H01M 10/36
GB    2030349           4/1980

OTHER PUBLICATIONS

Sharma et al., "Development of Carbon Nanotubes and Nanofluids Based Microbial Fuel Cell," Int'l J. of Hydrogen Energy, vol. 33, 2008, pp. 6749-6754.
(Continued)

*Primary Examiner* — Jonathan Crepeau
*Assistant Examiner* — Angela J Martin
(74) *Attorney, Agent, or Firm* — Eddie E. Scott (57) ABSTRACT

An electro-chemical energy conversion and storage device includes an enclosure, a first electrode operatively connected to the enclosure, a second electrode operatively connected to the enclosure, a nanofluid or particle suspension in the enclosure, a heat transfer unit, and a circulation system for circulating the nanofluid or particle suspension to the heat transfer unit. The nanofluid includes nanoparticles plus a dielectric or ionic fluid. The particle suspension includes particles plus a dielectric or ionic fluid. A wide range of nanoparticles or particles can be used. For example the following nanoparticles or particles can be used: metal and metal alloy particles for anodic dissolution and thermal transport; hydrides as source of hydrogen ions; lithium and lithium alloys; intercalated graphite and carbon aerogel as Li source (anodic material); intercalated transition metal oxide as Li sink (cathodic material); and semiconductors for
(Continued)

photovoltaic conversion in photo-electrochemical or hybrid electrochemical cell.

4 Claims, 7 Drawing Sheets

Related U.S. Application Data (60) Provisional application No. 61/177,520, filed on May 12, 2009.

(51) Int. Cl.
| | | |
|---|---|---|
| *H01M 8/18* | (2006.01) | |
| *H01M 10/34* | (2006.01) | |
| *H01M 14/00* | (2006.01) | |
| *H01M 10/0561* | (2010.01) | |
| *H01M 10/052* | (2010.01) | |
| *H01M 10/613* | (2014.01) | |
| *H01M 10/0525* | (2010.01) | |
| *H01M 10/0569* | (2010.01) | |
| *B60L 58/26* | (2019.01) | |
| *B60L 50/64* | (2019.01) | |

(52) U.S. Cl.
CPC ......... *H01M 8/188* (2013.01); *H01M 10/052* (2013.01); *H01M 10/0525* (2013.01); *H01M 10/0569* (2013.01); *H01M 10/345* (2013.01); *H01M 10/613* (2015.04); *H01M 14/005* (2013.01); *Y02E 60/122* (2013.01); *Y02E 60/124* (2013.01); *Y02E 60/528* (2013.01); *Y02T 10/705* (2013.01); *Y02T 10/7011* (2013.01)

(56) References Cited

U.S. PATENT DOCUMENTS

| | | | |
|---|---|---|---|
| 5,102,751 A | | 4/1992 | Narang et al. |
| 6,296,958 B1 | | 10/2001 | Pinto et al. |
| 6,432,579 B1 | * | 8/2002 | Tsuji ............... H01M 4/02 29/623.1 |
| 2006/0251957 A1 | | 11/2006 | Darcy et al. |
| 2007/0269688 A1 | * | 11/2007 | Lipilin ............... H01M 4/8626 429/430 |
| 2008/0302998 A1 | | 12/2008 | Hong |
| 2010/0003586 A1 | | 1/2010 | Sahu |
| 2010/0047671 A1 | * | 2/2010 | Chiang ............ B60L 11/1879 429/50 |

OTHER PUBLICATIONS

"Solid State," Oxford Dictionary (American English) (US). Oxford University Press, n.d. Web. Oct. 17, 2014., <http.//www.oxforddictionaries.com/us/definition/american_english/solid-state>.

* cited by examiner

ELECTROCHEMICAL NANOFLUID OR PARTICLE SUSPENSION ENERGY CONVERSION AND STORAGE DEVICE

CROSS-REFERENCE TO RELATED APPLICATIONS

The present application is a Division of patent application Ser. No. 12/777,943 filed. May 11, 2010, which claims the benefit under 35 U.S.C. § 119(e) of U.S. Provisional Patent Application No. 61/177,520 filed May 12, 2009 entitled "Electrochemical Nanofluid Energy Conversion and Storage Devices," the disclosure of which is hereby incorporated by reference in its entirety for all purposes.

STATEMENT AS TO RIGHTS TO INVENTIONS MADE UNDER FEDERALLY SPONSORED RESEARCH AND DEVELOPMENT

The United States Government has rights in this invention pursuant to Contract No. DE-AC52-07NA27344 between the United States Department of Energy and Lawrence Livermore National Security, LLC for the operation of Lawrence Livermore National Laboratory.

BACKGROUND

Field of Endeavor

The present invention relates to energy and more particularly to electrochemical energy storage.

State of Technology

Electrochemical energy storage is required for grid storage, wireless communications, portable computing, and will be essential for the realization of future fleets of electric and hybrid electric vehicles, which are now believed to be an essential part of the worlds strategy for reducing our dependence on oil, and minimizing the impact of gaseous emissions of $CO_2$ on global warming. In looking at those possible materials that can be used for anodes in electrochemical energy conversion and storage systems, hydrogen and lithium have the highest specific capacities (Ah/kg). Hydrogen is of course used to power fuel cells, while lithium is used in advanced rechargeable batteries.

Most state of the art energy storage systems use lithium ion battery chemistry, with graphite anodes that intercalate lithium upon charging, mixed transition metal oxide cathodes that intercalate lithium during discharge, a microporous polyethylene electrode separator, and electrolyte formed from a dielectric mixed solvent composed of organic carbonates and high-mobility lithium salts. The movement of the lithium ions between the intercalation anodes and cathodes during charge and discharge is known as the "rocking chair" mechanism.

Cells with liquid electrolytes are usually contained in cylindrical or prismatic metal cans, with stack pressure maintained by the walls of the can, while cells with polymer gel electrolytes are usually contained in soft-side aluminum-laminate packages, with stack pressure achieved through thermal lamination of the electrodes and separators, thereby forming a monolithic structure.

The active graphite or transition metal oxide materials used in the electrodes exist as fine powders, coated onto thin metal foils of copper and aluminum, respectively, and held in place by a PVDF binder. Both natural and manmade graphite such as MCMB have been used for the anodes, while $Li_xCoO_2$, $LiNiO_2$, $LiMn_2O_4$, mixed transition metal oxides with cobalt, nickel and manganese, and iron-phosphates are common choices for the cathode.

Over the past decade, these systems have attained outstanding specific energy and energy density, exceptional cycle life and rate capabilities that enable them to now be considered for both vehicular and power tool applications, in addition to their early applications in wireless communications and portable computing. The best commercially available, polymer-gel lithium ion battery now has a specific energy of 180 to 200 Wh/kg, an energy density of 360 to 400 Wh/L, and a reasonably good rate capability, allowing discharge at C/2 or better.

Both liquid prismatic and polymer gel cells have been incorporated into large high-capacity power packs and used to power the mobile electric vehicles. Such high capacity systems have state-of-the-art computerized charge and discharge control, which includes graphical user interfaces, sensing for monitoring the health of individual cells, and charge balancing networks.

Such lithium ion batteries, which rely on the rocking chair mechanism, are generally believed to be safer than those where lithium exists in the reduced metallic state. However, the use of flammable liquid-phase and two-phase polymer gel electrolytes, coupled with a high energy density, a relatively delicate 20-micron thick polymeric separator, and the possibility of lithium plating and dendrite formation due to non-uniform stack pressure and electrode misalignment has led to safety problems with these energy storage systems. The possibility of such an event occurring on commercial airliners, where many passengers carry laptop computers and cell phones with such batteries, is especially disconcerting. These events have occurred on much larger scale, and have caused industry-wide concern in the continued use of this important technology.

Adequate and intelligent thermal management in these cells is essential. High rates of charge or discharge drives the temperature upward due to resistive heating of the electrolyte. When the core temperature of these cells exceeds approximately 150° F., the systems frequently become unstable, with the possible initiation of autocatalytic reactions, which can lead to thermal runaway and catastrophic results. Disproportionation of the transition metal oxides can liberate sufficient oxygen to support oxidation of the organic carbonate solvents used in the liquid or polymer-gel electrolytes. It is now recognized that while conventional systems provide high energy density, their safety remains problematic.

The treatise, *Introduction to Nanotechnology*, by Charles P. Poole, Jr., and Frank J. Owens. John Wiley &. Sons, 2003, states: "Nanotechnology is based on the recognition that particles less than the size of 100 nanometers (a nanometer is a billionth of a meter) impart to nanostructures built from them new properties and behavior. This happens because particles which are smaller than the characteristic lengths associated with particular phenomena often display new chemistry and physics, leading to new behavior which depends on the size. So, for example, the electronic structure, conductivity, reactivity, melting temperature, and mechanical properties have all been observed to change when particles become smaller than a critical size."

SUMMARY

Features and advantages of the present, invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

The present invention provides an electro-chemical energy conversion and storage device. The electro-chemical energy conversion and storage device includes an enclosure, a first electrode operatively connected to the enclosure, a second electrode operatively connected to the enclosure, a nanofluid or particle suspension in the enclosure, a heat transfer unit, and a circulation system for circulating the nanofluid or particle suspension to the heat transfer unit.

The nanofluid is defined as: nanofluid=nanoparticles+ dielectric or ionic fluid. A wide range of nanoparticles can be used. For example the following nanoparticles can be used: metal and metal alloy particles for anodic dissolution and thermal transport; hydrides as source of hydrogen ions; lithium and lithium alloys; intercalated graphite and carbon aerogel as Li source (anodic material); intercalated transition metal oxide as Li sink (cathodic material); and semiconductors for photovoltaic conversion in photo-electrochemical or hybrid electrochemical cell.

The particle suspension is defined as: particle suspension=particles+dielectric or ionic fluid. A wide range of particles can be used. For example the following particles can be used: metal and metal alloy particles for anodic dissolution and thermal transport; hydrides as source of hydrogen ions; lithium and lithium alloys; graphite intercalated with lithium; and carbon aerogel with a coating of lithium as a lithium source (anodic material); intercalated transition metal oxides as lithium sink (cathodic material); and semiconductors for photovoltaic conversion in photo-electrochemical or hybrid electrochemical cell.

Nanoparticles or particles for the ananofluid or particle suspension anolyte can be made of pure elemental materials including Pb, Cd, Zn, Fe, Na, Ca, Mg, Al, and Li, as well as any alloy formed from these pure elemental materials. In the case of a nanofluid flow cell using lithium-ion type chemistry, the nanoparticles in the anolyte could be Li-intercalated natural graphite, Li-intercalated synthetic graphite, Li—S; alloys, Li—Sn alloys, or other Li-containing alloys or compounds. Similar compositions can be used for particles suspensions. In the case of a nanofluid flow cell using lithium-ion type chemistry, the nanoparticles in the catholyte could be a transition metal oxide such as $Li_xCoO_2$, $Li_xNiO_2$, $Li_xMn_2O_4$, a mixed transition metal oxide such as $Li_x(Co, Ni, Mn)O_2$, or a phosphate such as $Li_xFePO_4$. Similar compositions can be used for particle suspensions. Hydrides can also be used for anolyte nanoparticles or particles.

The present invention can be incorporated in different electrochemical and photo-electrochemical cell configurations. For example, present invention can be incorporated in the following cell configurations: anodic and cathodic nanofluid or particle suspension or particle suspensions in both compartments of divided cell (anodic nanofluid or particle suspension in the anode compartment of the cell and cathodic nanofluid or particle suspension in the cathode compartment of the cell); anodic nanofluid or particle suspension in the anode compartment for air or oxygen breathing cell; a storage system for oxygen/peroxide in oxygen/peroxide depolarized system; an air-sparged nanofluid or particle suspension oxygen cathode for air breathing cell; an electrolyte nanofluid or particle suspension in cell with solid anode and cathode; a photovoltaic nanofluid or particle suspension in photo-electrochemical cell; and anodic and cathodic nanoparticles forming a single nanofluid or particle suspension, with localized anode and cathode sites for energy harvesting from particles.

Some of the advantages of the present invention include: enhanced thermal management; thereby preventing thermal runaway in high capacity systems; overcoming solubility limit encountered in conventional liquid redox flow batteries through the use of solid particles; ability to provide unlimited capacity for a wide variety of chemistries; by simply enlarging the storage volumes for nanofluids or particle suspensions; fast mechanical recharging; and extremely high charge and discharge rates for vehicular applications (extreme rate capability), enabled by the short diffusion length, coupled with flow-control of turbulence and mixing.

Uses of the present invention include load leveling, uninterruptable power for computing and telecommunications, electric vehicles, hybrid electric vehicles, and other uses.

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

DETAILED DESCRIPTION OF SPECIFIC EMBODIMENTS

Referring to the drawings, to the following detailed description, and to incorporated materials, detailed information about the invention is provided including the description of specific embodiments. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

Electrochemical energy storage is required for numerous applications which are now believed to be an essential part of the world's strategy for reducing our dependence on oil, and minimizing the impact of gaseous emissions of $CO_2$ on global warming. Cells with liquid electrolytes are usually contained in cylindrical or prismatic metal cans, with stack pressure maintained by the walls of the can, while the two-phase polymer gel electrolytes are usually contained in an aluminum-laminate "candy wrapper" pouch, with stack pressure achieved through thermal lamination of the electrodes and separators, thereby forming a monolithic structure. Over the past decade, these systems have attained outstanding specific energy and energy density, exceptional cycle life and rate capabilities that enable them to now be considered for both vehicular and power tool applications, in addition to their early applications in wireless communications and portable computing. The best commercially available, polymer-gel lithium ion battery now has a specific energy of 180 to 200 Wh/kg, an energy density of 350 to 400 Wh/L, and a reasonably good rate capability, allowing discharge at C/2. A typical solid polymer electrolyte (SPE) cell has a specific energy of only ~100 Wh/kg, and an energy density of only ~80 Wh/L (though some higher values have been sporadically reported). Such lithium ion batteries, which rely on the rocking chair mechanism, are generally believed to be safer than those where lithium exists in the reduced metallic state. However, the use of flammable liquid-phase and two-phase polymer gel electrolytes, coupled with a high energy density, a relatively delicate 20-micron thick polymeric separator, and the possibility of lithium plating and dendrite formation due to non-uniform stack pressure and electrode misalignment has led to safety problems with these energy storage systems. Adequate and intelligent thermal management in these cells is essential. High rates of charge or discharge drives the temperature upward due to resistive heating of the electrolyte. When the core temperature of these cells exceeds approximately 150° F., the systems frequently become unstable, with the possible initiation of autocatalytic reactions, which can lead to thermal runaway and catastrophic results. Disproportionation of the transition metal oxides can liberate sufficient oxygen to support oxidation of the organic carbonate solvents used in the liquid or polymer-gel electrolytes. It is now recognized that while conventional systems provide high energy density, their safety remains problematic.

The present invention provides an electro-chemical energy conversion and storage device. The electro-chemical energy conversion and storage device includes an enclosure, a first electrode operatively connected to the enclosure, a second electrode operatively connected to the enclosure, a nanofluid or particle suspension in the enclosure, a heat transfer unit, and a circulation system for circulating the nanofluid or particle suspension to the heat transfer unit.

The nanofluid is defined as: nanofluid=nanoparticles+ dielectric or ionic fluid. A wide range of nanoparticles can be used. For example the following nanoparticles can be used: metal and metal alloy particles for anodic dissolution and thermal transport; hydrides as source of hydrogen ions; lithium and lithium alloys; intercalated graphite and carbon aerogel as Li source (anodic material); intercalated transition metal oxide as Li sink (cathodic material); and semiconductors for photovoltaic conversion in photo-electrochemical or hybrid electrochemical cell.

The particle suspension is defined as: particle suspension=particles+dielectric or ionic fluid. A wide range of particles can be used. For example the following particles can be used: metal and metal alloy particles for anodic dissolution and thermal transport; hydrides as source of hydrogen ions; lithium and lithium alloys; intercalated graphite and carbon aerogel as Li source (anodic material); intercalated transition metal oxide as Li sink (cathodic material); and semiconductors for photovoltaic conversion in photo-electrochemical or hybrid electrochemical cell.

Examples of nanoparticles and particles that can be used in the nanofluid or particle suspension are included in Table 1 below.

TABLE 1

| Anodic Metal Nanoparticles | Li Ion Type Nanoparticles | Anodic Hydride Nanoparticles |
|---|---|---|
| Pb & Pb Alloys | Lithium and Lithium Alloys | LaCuNi4 |
| Cd & Cd Alloys | Graphite Intercalated with Li | Mm0.85CeO.15Ni5 |
| Zn & Zn Alloys | Intercalation Cathode for Li-Ion Type Fluid Cell | LaNi5 |
| Fe & Fe Alloys | | La0.7Ce0.3Ni5 |
| Si & Si Alloys | | FeTi |
| Na & Na Alloys | | Niobium |
| Ca & Ca Alloys | | Mm1.05Ni4.97Al0.03 |
| Mg & Mg Alloys | | FeTiMn |
| Al & Al Alloys | | Alanate |
| Li & Li Alloys | | |
| Ag & Ag Alloys | | |
| Cu & Cu Alloys | | |

Examples of Nanoparticles for Nanofluid or Particle Suspension

Examples of electro-chemical energy conversion and storage systems constructed in accordance with the present invention are described below.

Example 1

Divided Energy Storage Battery

Figure 1:
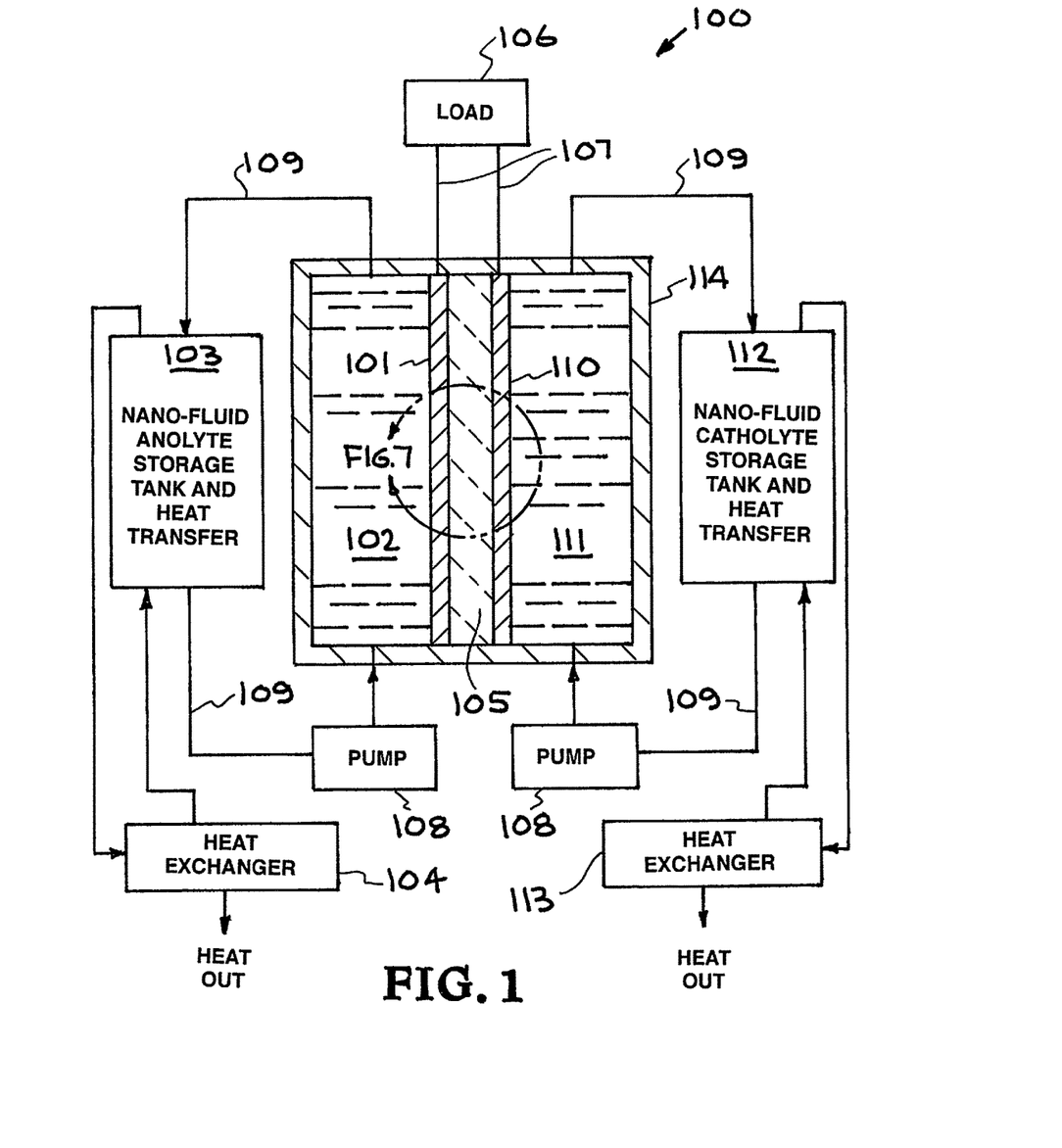
FIG. 1 illustrates a divided energy storage battery with anodic and cathodic nanofluid or particle suspension or particle suspensions in both compartments of the divided battery.

An example of electro-chemical energy conversion and storage systems constructed in accordance with the present invention is illustrated in FIG. 1. A divided energy storage battery with anodic and cathodic nanofluid or particle suspension or particle suspensions in both compartments of the divided battery is shown in FIG. 1. The divided energy storage battery is designated generally by the reference numeral 100. The divided energy storage battery 100 provides a new inherently safe, high-energy, high-rate rechargeable battery. The divided energy storage battery 100 includes the following components: electro-catalytic anode 101, nanofluid or particle suspension anolyte 102, nanofluid or particle suspension anolyte storage tank & heat transfer 103, heat rejection—anode 104, electrolyte & separator 105, load 106, electrical connectors 107, pump 108, fluid lines 109, electro-catalytic cathode 110, nanofluid or particle suspension catholyte 111, nanofluid or particle suspension catholyte storage tank & heat transfer 112, heat rejection—cathode 113, and housing 114. The housing is made at least in part of a non-conductive material. The electrolyte & separator 105 is constructed of solid state electrolytes for electrode separator-electrolyte layer. Examples of the solid state electrolytes for electrode separator-electrolyte layer are shown in Table 2 below.

TABLE 2

| Electrolyte | Conductivity (S m$^1$) |
|---|---|
| AgI | 10$^{-3}$ |
| Ag$_3$SI | 1 |
| RbAg$_4$I$_5$ | 3.0 |
| β-(Al$_2$O$_3$)$_{11}$(Na$_2$O)$_1$ | 3 |

TABLE 2-continued

| Electrolyte | Conductivity (S m$^1$) |
|---|---|
| LiI(Al$_2$O$_3$) | $10^{-3}$ |
| LiI | $10^{-5}$ |
| LiX-PEO | $10^{-5}$ |
| Li$_{0.35}$I$_{0.14}$O$_{0.007}$P$_{0.11}$S$_{0.98}$ | $5 \times 10^{-2}$ |
| MEEP | $10^{-2}$ |
| Plasticized SPEs | $10^{-1}$ |
| Li$_{0.35}$I$_{0.12}$O$_{0.31}$P$_{0.12}$S$_{0.58}$ | $2 \times 10^{-3}$ |
| Li$_{0.39}$N$_{0.020}$O$_{3.47}$P$_{0.12}$ | $3 \times 10^{-4}$ |

The electro-catalytic anode 101 gives up electrons at a potential above that of the electro-catalytic cathode 110. The conductive link via the load 106 through electrical connectors 107 carries electrons from the electro-catalytic anode 101 to the electro-catalytic cathode 110. The nanofluid or particle suspension anolyte 102 dissociates ions. These ions serve to deliver electrons and chemical matter through the nanofluid or particle suspension anolyte 102 to balance the flow of electric current through the load 106 during operation.

The divided energy storage battery 100 includes electro-catalytic anode 101 and electro-catalytic cathode 110 electrically connected across load 106 by electrical connectors 107. A nanofluid or particle suspension anolyte 102 is contained within housing 114 adjacent electro-catalytic anode 101. The nanofluid or particle suspension anolyte 102 is circulated to a nanofluid or particle suspension anolyte storage tank and heat transfer unit 103 through fluid lines 109 by pump 108. Nanofluid or particle suspension anolyte storage tank and heat transfer unit 103 provides heat rejection 104. The nanofluid or particle suspension anolyte 102 is a nanofluid or particle suspension.

The nanofluid is defined as: nanofluid=nanoparticles+ dielectric or ionic fluid. A wide range of nanoparticles can be used. The particle suspension is defined as: particle suspension=particles+dielectric or ionic fluid. A wide range of particles can be used. Examples of nanoparticles and particles that can be used in the nanofluid or particle suspension are included in Table 1 above.

A nanofluid or particle suspension catholyte 111 is contained within housing 114 adjacent electro-catalytic cathode 110. The nanofluid or particle suspension catholyte 111 is circulated to a nanofluid or particle suspension catholyte storage tank and heat transfer 112 through fluid lines 109 by pump 108. Nanofluid or particle suspension catholyte storage tank and heat transfer 112 provides heat rejection 113.

The electro-catalytic anode 101 gives up electrons at a potential above that of the electro-catalytic cathode 110. The conductive link via the load 106 through electrical connectors 107 carries electrons from the electro-catalytic anode 101 to the electro-catalytic cathode 110. nanofluid or particle suspension catholyte 111 dissociates ions. These ions serve to deliver electrons and chemical matter through the nanofluid or particle suspension catholyte 111 to balance the flow of electric current through the load 106 during operation.

The nanofluid is defined as: nanofluid=nanoparticles+ dielectric or ionic fluid. A wide range of nanoparticles can be used. The particle suspension is defined as: particle suspension=particles+dielectric or ionic fluid. A wide range of particles can be used. Examples of nanoparticles and particles that can be used in the nanofluid or particle suspension are included in Table 1 above.

Example 2

Air or Oxygen Breathing Battery

Figure 2:
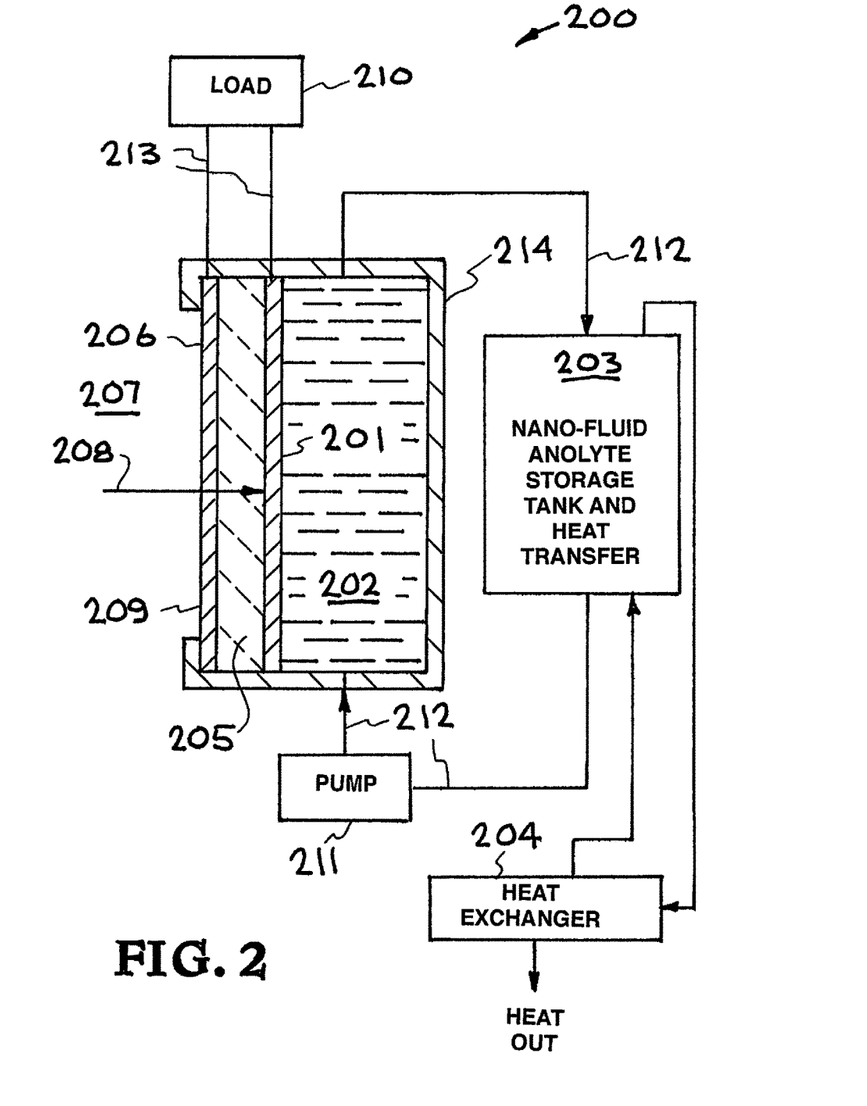
FIG. 2 illustrates an air or oxygen breathing nanofluid or particle suspension flow battery.

An example of an electro-chemical energy conversion and storage system constructed in accordance with the present invention is illustrated in FIG. 2. The air or oxygen breathing nanofluid or particle suspension flow battery is designated generally by the reference numeral 200. The air or oxygen breathing nanofluid or particle suspension flow battery 200 includes the following components: electro-catalytic anode 201, nanofluid or particle suspension anolyte 202, nanofluid or particle suspension anolyte storage tank & heat transfer 203, heat rejection 204, electrolyte & separator 205, oxygen, cathode 206, oxygen or air 207, selective transport of molecular oxygen 208, oxygen selective membrane 209, load 210, pump 211, fluid lines 212, electrical connectors 213, and housing 214. The housing is made at least in part of a non-conductive material. The air or oxygen breathing nanofluid or particle suspension flow battery 200 provides a new inherently safe, high-energy, high-rate rechargeable battery.

The air or oxygen breathing nanofluid or particle suspension flow battery 200 includes electro-oxygen cathode 206, and electro-catalytic anode 201. The electro-oxygen cathode 206 and electro-catalytic anode 201 are electrically connected across load 206 by electrical connectors 213.

Oxygen or air 207 provides selective transport of molecular oxygen 208 through oxygen selective membrane 209 to electrolyte and separator 205.

The nanofluid or particle suspension anolyte 202 is contained within housing 214 adjacent oxygen cathode 206 and electro-catalytic anode 201.

The electro-catalytic anode 201 gives up electrons at a potential above that of the electro-oxygen cathode 206. The conductive link via the load 210 through electrical connectors 213 carries electrons from the electro-catalytic anode 201 to the electro-oxygen cathode 206. The nanofluid or particle suspension anolyte 202 dissociates ions. These ions serve to deliver electrons and chemical matter through the nanofluid or particle suspension anolyte 202 to balance the flow of electric current through the load 210 during operation.

The nanofluid or particle suspension anolyte 202 is circulated to a nanofluid or particle suspension anolyte storage tank and heat transfer unit 203 through fluid lines 212 by pump 211. Nanofluid or particle suspension anolyte storage tank and heat transfer unit 203 provides heat rejection 204. The nanofluid or particle suspension anolyte 202 is a nanofluid or particle suspension.

The nanofluid is defined as: nanofluid=nanoparticles+ dielectric or ionic fluid. A wide range of nanoparticles can be used. The particle suspension is defined as: particle suspension=particles+dielectric or ionic fluid. A wide range of particles can be used. Examples of nanoparticles and particles that can be used in the nanofluid or particle suspension are included in Table 1 above.

Example 3

Circulation System for Nanofluid or Particle Suspension

Figure 3:
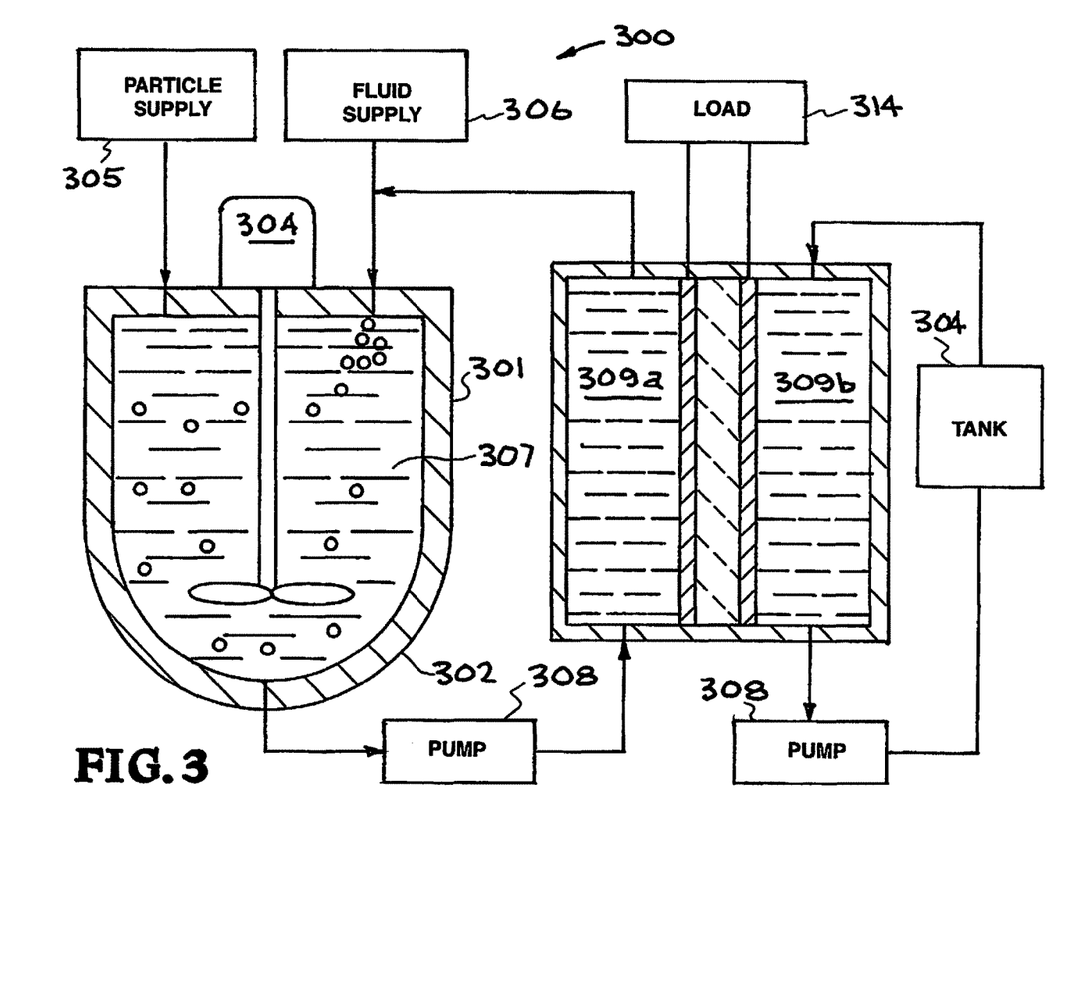
FIG. 3 illustrates a circulation system for a nanofluid or particle suspension.

Referring now to FIG. 3, an example of a circulation system for a nanofluid or particle suspension energy storage system is illustrated. The circulation system is designated generally by the reference numeral 300. The circulation system 300 includes the following components: vessel 301, rounded bottom 302, motor driven agitator 304, particle supply 305, fluid supply 306, nanofluid or particle suspension solution 307, pump 308, cell 309, pump 310, tank 312, and load 314. The nanofluid or particle suspension solution 307 is a nanofluid or particle suspension.

The nanofluid or particle suspension solution 307 is produced by fluid from fluid supply 306 and particles from particle supply 305 being introduced into the vessel 301. The motor driven agitator 304 mixes fluid from fluid supply 306 and particles from particle supply 305. The nanofluid or particle suspension solution 307 is circulated to a nanofluid or particle suspension storage tank and heat transfer unit 309 through fluid lines by pump 308. A pump 310 pumps fluid from tank 312 into cell 309. The nanofluid or particle suspension solution 307 is a nanofluid or particle suspension.

The nanofluid is defined as: nanofluid=nanoparticles+ dielectric or ionic fluid. The particle suspension is defined as: particle suspension=particles+dielectric or ionic fluid. The fluid in fluid supply 306 is a dielectric or ionic fluid. A wide range of nanoparticles and particles can be used. Examples of nanoparticles and particles that can be used in the nanofluid or particle suspension are included in Table 1 above.

The nanofluid or particle suspension storage tank and heat transfer unit 309 provides heat rejection. The nanofluid or particle suspension storage tank and heat transfer unit 309 includes an electro-catalytic anode, an electro-catalytic cathode, and load. The electro-catalytic anode gives up electrons at a potential above that of the electro-catalytic cathode. The conductive link via the load through electrical connectors carries electrons from the electro-catalytic anode to the electro-catalytic cathode. The nanofluid or particle suspension anolyte dissociates ions. These ions serve to deliver electrons and chemical matter through the nanofluid or particle suspension anolyte to balance the flow of electric current through the load during operation.

Example 4

Air-Sparged Nanofluid or Particle Suspension Oxygen Cathode

Figure 4:
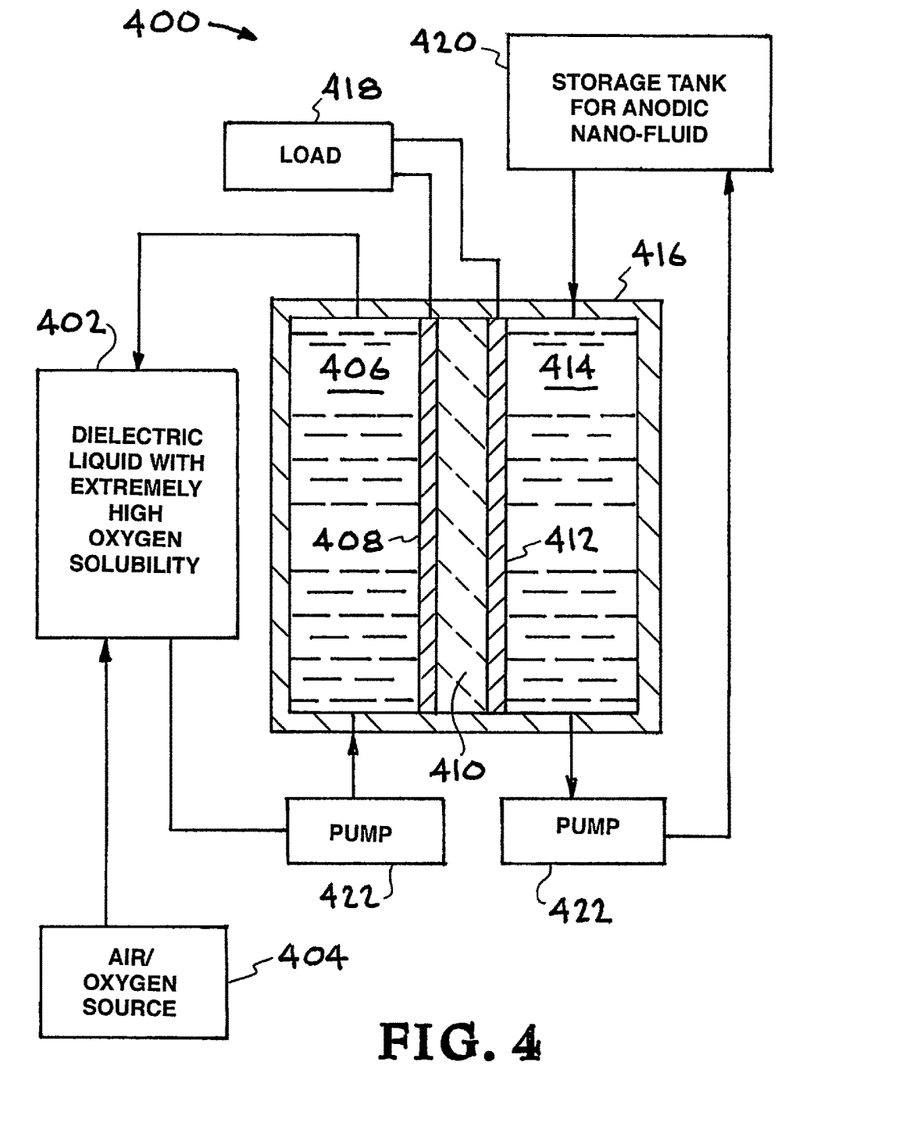
FIG. 4 illustrates an air-sparged nanofluid or particle suspension oxygen cathode for air breathing cell.

Referring now to FIG. 4, an example of an air-sparged nanofluid or particle suspension oxygen cathode for air breathing cell is illustrated. The air-sparged nanofluid or particle suspension oxygen cathode for air breathing cell is designated generally by the reference numeral 400.

The air-sparged nanofluid or particle suspension oxygen cathode 400 includes dielectric liquid with extremely high oxygen solubility 402, air or oxygen source 404, cathode 406, porous metal contact 408, electrode separator and electrolyte layer 410, porous metal contact 412, anode chamber with anodic nanofluid or particle suspension 414, housing 416; load 418, storage tank 420, and pump 422. The housing is made at least in part of a non-conductive material. The air or oxygen source 404 is connected to dielectric liquid with extremely high oxygen solubility 402.

The anodic nanofluid or particle suspension 414 is circulated to a storage tank 420 through fluid lines by pump 422. Nanofluid or particle suspension anodic nanofluid or particle suspension 414 is a nanofluid or particle suspension.

The nanofluid is defined as: nanofluid=nanoparticles+ dielectric or ionic fluid. A wide range of nanoparticles can be used. The particle suspension is defined as: particle suspension=particles+dielectric or ionic fluid. A wide range of particles can be used. Examples of nanoparticles and particles that can be used in the nanofluid or particle suspension are included in Table 1 above.

The cathode 406 and porous metal contact 412 transfer electrons. The conductive link via the load 418 through electrical connectors carries electrons from the cathode 406 to porous metal contact 412. The anodic nanofluid or particle suspension 414 dissociates ions. These ions serve to deliver electrons and chemical matter through the anodic nanofluid or particle suspension 414 to balance the flow of electric current through the load 418 during operation.

Example 5

Photovoltaic Nanofluid or Particle Suspension in Photo-Electrochemical Cell

Figure 5:
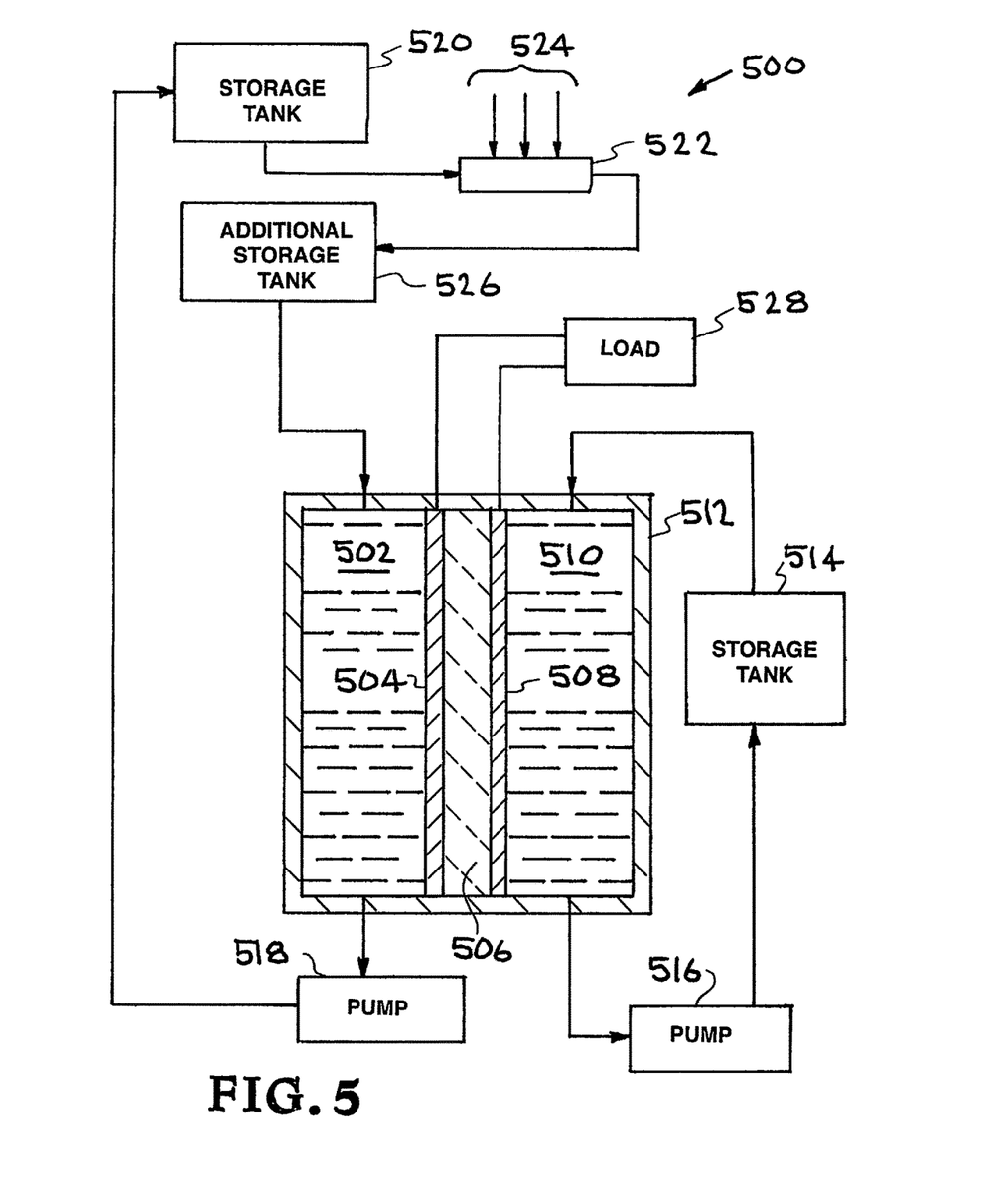
FIG. 5 illustrates a photovoltaic nanofluid or particle suspension in photo-electrochemical cell.

Referring now to FIG. 5, an example of a photovoltaic nanofluid or particle suspension in photo-electrochemical cell is illustrated. The photovoltaic nanofluid or particle suspension in photo-electrochemical cell is designated generally by the reference numeral 500. The photovoltaic nanofluid or particle suspension in photo-electrochemical cell 500 includes the following components: photo chemically activated fluid chamber 502, porous metal contact 504, electrode separator and electrolyte layer 506, porous metal contact 508, nanofluid or particle suspension chamber 510, housing 512, storage tank, pump 516, pump 518, storage tank, 520, photo chemical reactor 522, light source 524, additional storage tank 526, and load 528.

Electrical power is produced from sun light or other light 524. The sun light or other light 524 is received by photo chemical reactor 522. The photo chemical reactor 522 is connected to additional storage tank 526, photo chemically activated fluid chamber 502, pump 518, and storage tank, 520. The sun light or other light 524 received by photo chemical reactor 522 results in photochemical reaction of nanoparticle or particle suspension in photo chemical reactor 522. The nanoparticle or particle suspension is circulated through additional storage tank 526, photo chemically activated fluid chamber 502, and storage tank, 520 by pump 518.

A porous metal contact 504 is operatively connected to the photo chemically activated fluid chamber 502. An electrode separator and electrolyte layer 506 is located between porous metal contact 504 and porous metal contact 508. The electrode separator and electrolyte layer 506 is constructed of solid state electrolytes for electrode separator-electrolyte layer. Examples of the solid state electrolytes for electrode separator-electrolyte layer are shown in Table 2 above.

Porous metal contact 504 and porous metal contact 508 are electrically connected across load 528 by electrical connectors. A nanofluid or particle suspension is contained in nanofluid or particle suspension chamber 510. The nanofluid or particle suspension is circulated through storage tank 514 and nanofluid or particle suspension chamber 510 by pump 516. The nanofluid or particle suspension in the nanofluid or particle suspension chamber 510 can be a wide range of nanoparticles or a wide range of particles. Examples of nanoparticles and particles that can be used are included in Table 1 above.

Example 6

Figure 6:
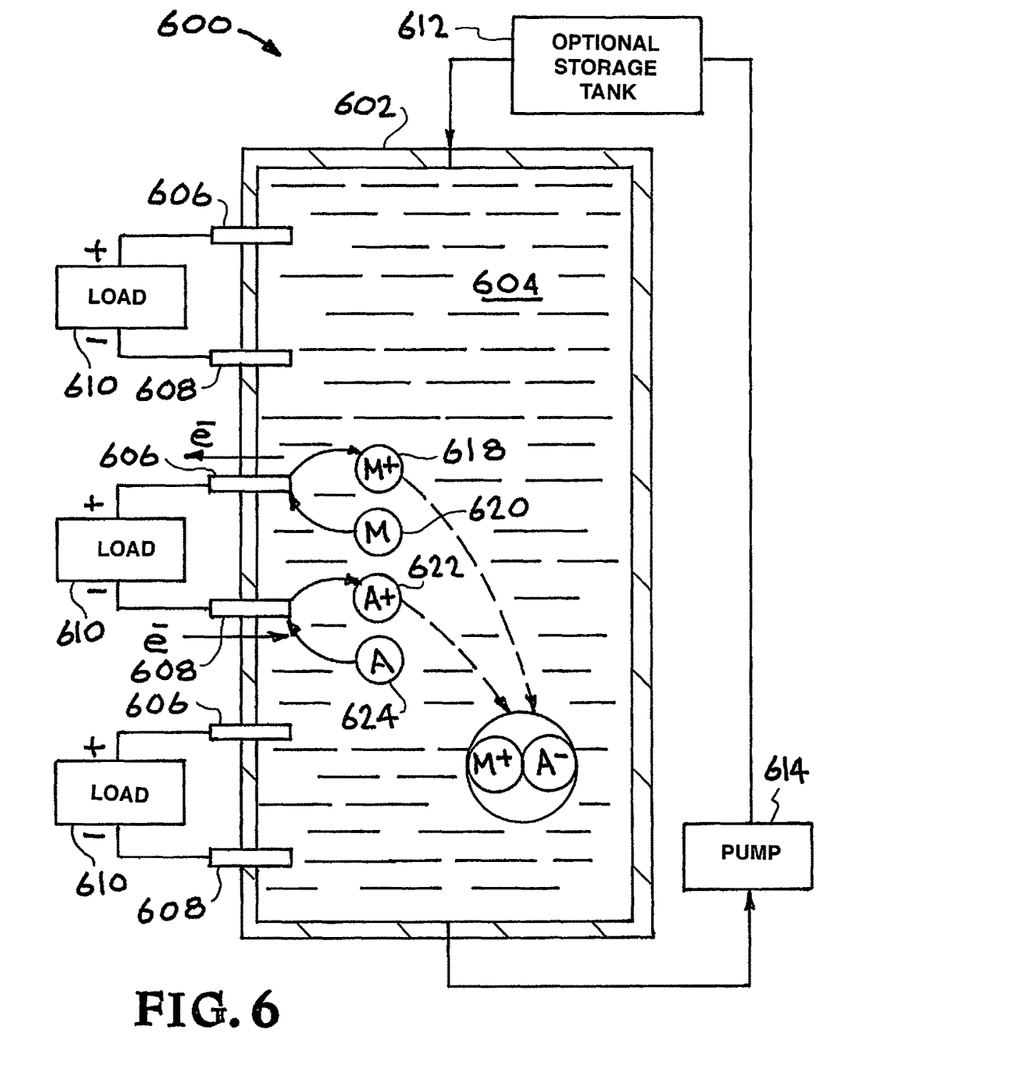
FIG. 6 illustrates an anodic and cathodic nanoparticles forming a single nanofluid or particle suspension, with localized anode and cathode sites for energy harvesting from particles

Anodic and Cathodic Nanoparticles Forming a Single Nanofluid or Particle Suspension, with Localized Anode and Cathode Sites for Energy Harvesting from Particles Referring now to FIG. 6, an example of an anodic and cathodic nanoparticles forming a single nanofluid or particle suspension, with localized anode and cathode sites for energy harvesting from particles is illustrated. The anodic and cathodic nanoparticles forming a single nanofluid or particle suspension, with localized anode and cathode sites for energy harvesting from particles is designated generally by the reference numeral 600. The anodic and cathodic nanoparticles forming a single nanofluid or particle suspension, with localized anode and cathode sites for energy harvesting from particles 600 includes the following components: housing 602, mixed anodic-cathodic nanofluid or particle suspension 604, anode 606, cathode 608, load 610, optional storage tank 612, pump 614, particle 618, particle or ion 620, particle 622, and particle or ion 624.

Electrical power is produced by anode 606 and cathode 608 being connected across load 610 by suitable electrical connectors. The housing 602 contains mixed anodic-cathodic nanofluid or particle suspension 604. An anode 606 is shown as a functionalized species-specific anode 606 and the cathode 608 is shown as a functionalized species-specific cathode 608. Nanoparticles or particles in mixed anodic-cathodic nanofluid or particle suspension 604 produce particle 618 and particle or ion 620 that interact with anode 606. Nanoparticles or particles in mixed anodic-cathodic nanofluid or particle suspension 604 produce particle 622 and particle or ion 624 that interact with cathode 608.

The mixed anodic-cathodic nanofluid or particle suspension 604 can be circulated to optional storage tank 612 through suitable fluid lines by pump 614. The mixed anodic-cathodic nanofluid or particle suspension 604 is a nanofluid or particle suspension. The nanofluid is defined as: nanofluid=nanoparticles+dielectric or ionic fluid. A wide range of nanoparticles can be used. The particle suspension is defined as: particle suspension=particles+dielectric or ionic fluid. A wide range of particles can be used. Examples of nanoparticles and particles that can be used in the nanofluid or particle suspension are included in Table 1 above.

Nanofluid or Particle Suspension

Figure 7:
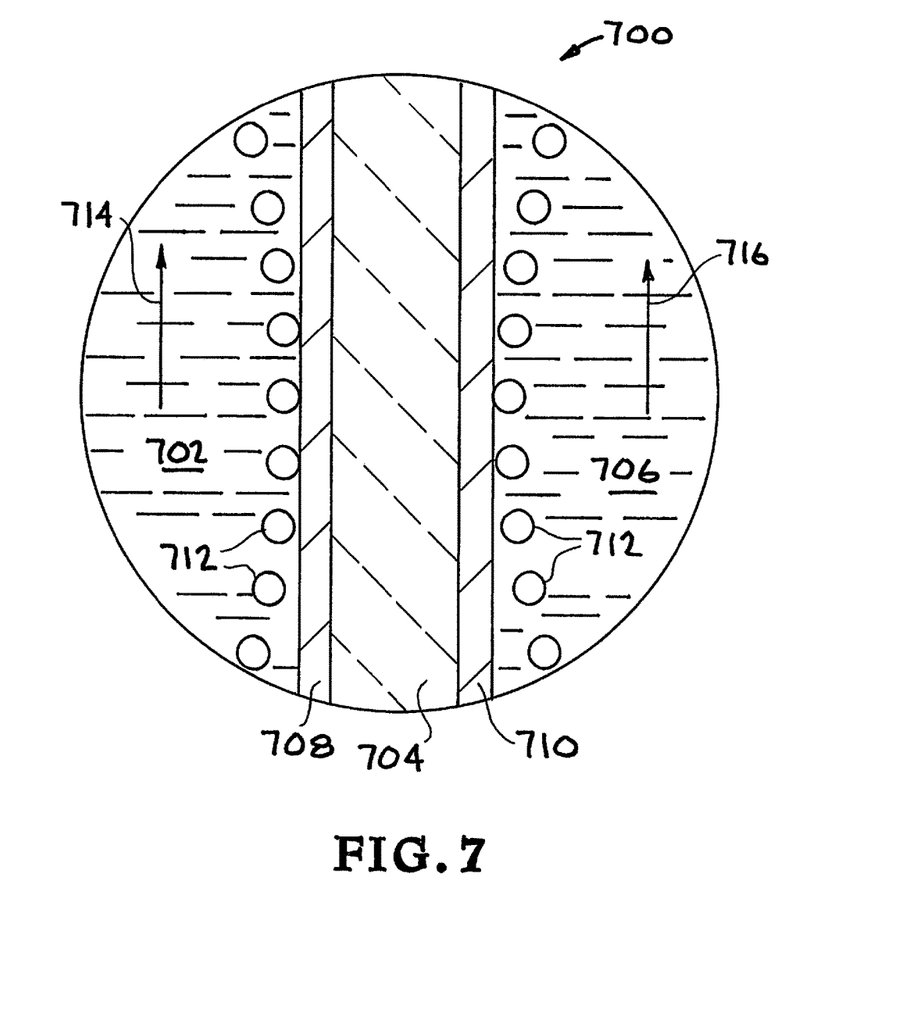
FIG. 7 is the area designated in FIG. 1 that illustrates the nanofluid or particle suspension.

Referring now to FIG. 7, a partial view of the reaction chambers of FIG. 1 is shown. The partial view of the reaction chambers is designated generally by the reference numeral 700. The area 700 designated in FIG. 1 is shown to illustrate the nanofluid or particle suspension and the interaction of the nanofluid or particle suspension with contact separator and electrolyte layer 704. The partial view of the reaction chambers includes the following components: nanofluid or particle suspension anolyte 702, contact separator and electrolyte layer 704, nanofluid or particle suspension catholyte 706, porous metal contact (electro catalytic anode) 708, porous metal contact (electro catalytic cathode) 710, particles in nanofluid or particle suspension swept along by fluid flow 712, fluid flow arrow (nanofluid or particle suspension anolyte) 714, and fluid flow arrow (nanofluid or particle suspension catholyte) 716.

The nanofluid or particle suspension and the interaction of the nanofluid or particle suspension interacts with the porous metal contact (electro catalytic anode) 708, porous metal contact (electro catalytic cathode) 710, and separator and electrolyte layer 704. The separator and electrolyte layer 704 is constructed of solid state electrolytes for an electrode separator-electrolyte layer. Examples of the solid state electrolytes for an electrode separator-electrolyte layer are shown in Table 2 above.

The particles 712 in the nanofluid or particle suspension are swept along by fluid flow as indicated by the fluid flow arrow (nanofluid or particle suspension anolyte) 714 and fluid flow arrow (nanofluid or particle suspension catholyte) 716. The particles 712 in nanofluid or particle suspension anolyte 702 are shown contacting the porous metal contact (electro catalytic anode) 708 by impingement. The particles 712 in nanofluid or particle suspension catholyte 706 are shown contacting the porous metal contact (electro catalytic cathode) 710 by impingement. Examples of the particles 712 in the nanofluid or particle suspension are included in Table 1 above.

Some of the advantages of the nanofluid or particle suspension nanofluid or particle suspension anolyte 702 and the nanofluid or particle suspension catholyte 706 include: enhanced thermal management; prevention of thermal runaway in high capacity systems; overcoming solubility limit of encountered in liquid redox batteries by enlarging the storage volumes for ano/cathodic nanofluids or particle suspensions; ability to provide unlimited capacity for a wide variety of chemistries; fast mechanical recharging; and extremely high charge and discharge rates for vehicular applications (extreme rate capability), enabled by the short diffusion length, coupled with flow-control of turbulence and mixing.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A battery apparatus that provides electrical energy across a load, comprising:
   a battery housing having a first side, a second side opposite said first side, and an enclosure between said first side and said second side having an anode compartment immediately adjacent said first side and a cathode compartment immediately adjacent said second side,
   a solid electro-catalytic anode in said anode compartment of said enclosure,
   a particle suspension anolyte in said anode compartment between said first side and said solid electro-catalytic anode
   wherein said particle suspension anolyte includes nanoparticles that are lithium or lithium alloys,
   an anolyte circulation and storage system, said anolyte circulation system including
   a vessel,
   a rounded bottom of said vessel,
   a particle supply connected to said vessel,
   a fluid supply connected to said vessel,
   a motor driven agitator in said vessel, and
   a pump connected between said vessel and said anode compartment,
   a solid electro-catalytic cathode in said cathode compartment,
   a particle suspension in said cathode compartment between said second side and said solid electro-catalytic cathode,
   a particle suspension catholyte storage unit,
   a solid state electrolyte separator between and in direct contact with said solid electro-catalytic anode and said solid electro-catalytic cathode thereby separating said anode compartment from said cathode compartment,
   electrical connectors connecting said solid electro-catalytic anode and said solid electro-catalytic cathode across the load, and
   a catholyte circulation system for circulating said catholyte from said particle suspension catholyte storage unit to said cathode compartment.

2. The energy storage battery apparatus of claim 1 wherein said particle suspension anolyte is a particle suspension that includes anodic hydride nanoparticles and a dielectric or ionic fluid.

3. The electro-chemical energy conversion and storage apparatus of claim 2 wherein said anodic hydride nanoparticles are hydrides as a source of hydrogen ions.

4. The energy storage battery apparatus of claim 1 wherein said particle suspension anolyte includes lithium or lithium alloys nanoparticles and a dielectric or ionic fluid.

* * * * *